United States Patent [19]
Doerge

[11] Patent Number: 5,254,601
[45] Date of Patent: Oct. 19, 1993

[54] HCEC BLOWN RIGID FOAMS WITH LOW THERMAL CONDUCTIVITY

[75] Inventor: Herman P. Doerge, Pittsburgh, Pa.

[73] Assignee: Miles Inc., Pittsburgh, Pa.

[21] Appl. No.: 763,109

[22] Filed: Sep. 20, 1991

[51] Int. Cl.$^5$ ................................................ C08J 9/14
[52] U.S. Cl. .................................... 521/131; 521/172; 521/174
[58] Field of Search ........................ 521/131, 172, 174

[56] References Cited

U.S. PATENT DOCUMENTS

| | | | |
|---|---|---|---|
| 4,927,863 | 5/1990 | Bartlett et al. | 521/131 |
| 4,943,597 | 7/1990 | Grünbauer et al. | 521/167 |
| 4,945,119 | 7/1990 | Smits et al. | 521/131 |
| 4,960,804 | 10/1990 | Doerge | 521/130 |

OTHER PUBLICATIONS

Database, WPIL, wk 9025, May 10, 1990, AN 188939 & JP-A-2 123 119 (Matsushita Reiki K.K.)-Abstract. Chemical Abstract Nr. 113(16)133885r.
Database WPIL, wk 9129, Jun. 11, 1991, AN 213185, & JP-A-3 137 138 (Matsushita Reiki K.K.)-Abstract, Chemical Abstract, No. 116(2)7405h.
Database WPIL, wk 9129, Jun. 11, 1991, AN 213184 & JP-A-3 137 137 (Matsushita Reiki K.K.)-abstract, Chemical Abstract, No. 116(2)7404g.

Primary Examiner—Morton Foelak
Attorney, Agent, or Firm—Joseph C. Gil; Lyndanne M. Whalen

[57] ABSTRACT

Rigid polyurethane foams having low thermal conductivity values are produced by reacting an organic polyisocyanate with an organic material having at least two isocyanate reactive hydrogen atoms and an OH value of from about 200 to about 650 in the presence of a blowing agent. The blowing agent is a mixture of 1,1-dichloro-2,2,2-trifluoroethane (HCFC-123) or dichlorofluoroethane (HCFC-141b) and from about 0.1 to about 1.0% by weight (based on total weight of the foam forming mixture) water. The foams obtained are characterized by a thermal conductivity of less than about 0.130 Btu-in./hr.ft $^2$°F., preferably less than about 0.120 Btu-in./hr.ft$^2$°F. These foams are particularly useful as insulation materials.

10 Claims, No Drawings

HCEC BLOWN RIGID FOAMS WITH LOW THERMAL CONDUCTIVITY

BACKGROUND OF THE INVENTION

The present invention relates to a process for producing rigid polyurethane foams having a thermal conductivity of less than about 0.130 Btu-in./hr.ft$^2$°F. and to the foams produced by this process.

Rigid polyurethane foams and processes for their production are well known in the art. Such foams are typically produced by reacting a polyisocyanate with an isocyanate-reactive material such as a polyol in the presence of a chlorofluorocarbon blowing agent. It is also known, however, that these chlorofluorocarbon blowing agents pose environmental problems.

Alternatives to the known chlorofluorocarbon blowing agents are currently the subject of much research. Hydrogen chlorofluorocarbons (HCFC) are among the most promising alternatives. However, some HCFCs must be used in larger amounts than the traditional chlorofluorocarbons and often result in foams having thinner cell walls. The HCFCs also tend to migrate from foam cell cavities thereby reducing the insulation value of the foam. Further, HCFCs produce a more thermally conductive foam insulation which reduces the energy efficiency of appliances, e.g., which are insulated with such foams. Consequently, substitution of HCFCs for the traditional chlorofluorocarbons may resolve the environmental problems created by chlorofluorocarbons but it creates an energy efficiency problem. It would therefore be advantageous to develop a process for producing energy efficient, rigid polyurethane foams in which none of the traditional chlorofluorocarbon blowing agents was employed.

One approach to resolving the migration problem of HCFCs has been to use mixtures of the traditional chlorofluorocarbons and the HCFCS. This approach is disclosed in U.S. Pat. Nos. 4,927,863 and 4,945,119. These blowing agent mixtures do, however, include some of the undesirable traditional chlorofluorocarbons.

U.S. Pat. No. 4,943,597 discloses a process for producing rigid polyurethane foams in which water is used as the blowing agent. Other optional blowing agents disclosed in this patent include the known low boiling halogenated halocarbons and "azo" blowing agents.

U.S. Pat. No. 4,960,804 discloses a process for producing rigid foams in which a mixture of an HCFC and an alkyl alkanoate is used as the blowing agent.

SUMMARY OF THE INVENTION

It is an object of the present invention to provide a process for the production of rigid polyurethane foams in which none of the traditional chlorofluorocarbon blowing agents are employed.

It is also an object of the present invention to provide a process for the production of rigid polyurethane foams having a low thermal conductivity in which a chlorofluorocarbon is not employed.

It is a further object of the present invention to provide low thermal conductivity rigid polyurethane foams.

These and other objects which will be apparent to those skilled in the art are accomplished by reacting an organic polyisocyanate with an organic material having at least two isocyanate reactive hydrogen atoms in the presence of a blowing agent which is a mixture of water and either dichlorofluoroethane (HCFC-141b) or 1,1-dichloro-2,2,2-trifluoroethane (HCFC-123). The water must be present in an amount of from about 0.1 to about 1.0% by weight of the total foam forming mixture. The resultant foams are characterized by a thermal conductivity of less than about 0.130, preferably less than about 0.120 Btu-in./hr.ft$^2$°F.

DETAILED DESCRIPTION OF THE INVENTION

In the process of the present invention, an organic polyisocyanate is reacted with an organic material having at least two isocyanate reactive hydrogen atoms in the presence of a mixture of water and either 1,1-dichloro-2,2,2-trifluoroethane (HCFC-123) or dichlorofluoroethane (HCFC-141b).

The HCFC-123 and HCFC-141b are commercially available and may generally be included in the reaction mixture in an amount of from about 10 to about 22% by weight, preferably from about 15 to about 20% by weight, and most preferably about 16–18% by weight, based upon the total weight of the foam forming mixture.

The water included in the foam forming mixture is generally included in an amount of from about 0.1 to about 1.0% by weight, preferably from about 0.15 to about 0.60% by weight, and most preferably about 0.2% by weight, based upon the total weight of the foam forming mixture.

The HCFC-123 or HCFC-141b and water may be added individually to the foam forming reaction mixture but it is preferred that the HCFC-123 or HCFC-141b and water be combined to form a mixture prior to addition to the foam forming mixture.

Any of the known organic polyisocyanates may be used in the process of the present invention. Suitable polyisocyanates include: aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane,1,4-diisocyanate, hexahydrotoluene diisocyanate (and isomers), naphthylene-1,5-diisocyanate, 1-methylphenyl-2,4-phenyl diisocyanate, diphenylmethane-4,4'-diisocyanate, diphenylmethane-2,4'-diisocyanate, 4,4'-biphenylene diisocyanate, 3,3'-dimethoxy-4,4'-biphenylene diisocyanate and 3,3'-dimethyldiphenylpropane- 4,4'-diisocyanate; triisocyanates such as toluene-2,4,6-triisocyanate and polyisocyanates such as 4,4'-dimethyldiphenylmethane-2,2',5,5'-tetraisocyanate and the diverse polymethylenepolyphenylpolyisocyanates.

A crude polyisocyanate may also be used in making polyurethanes, such as the crude toluene diisocyanate obtained by the phosgenation of a mixture of toluene diamines or the crude diphenylmethane diisocyanate obtained by the phosgenation of crude diphenylmethanediamine. The preferred undistilled or crude polyisocyanates are disclosed in U.S. Pat. No. 3,215,652, incorporated by reference.

Especially preferred for making rigid polyurethanes are methylene-bridged polyphenyl/polyisocyanates and prepolymers of methylene-bridged polyphenyl/-polyisocyanates, having an average functionality of from about 1.8 to about 3.5, preferably about 2.0 to about 3.1 isocyanate moieties per molecule and an NCO content of from about 28 to about 34% by weight, due to their ability to cross-link the polyurethane. The isocyanate index (ratio of equivalents of isocyanates to equivalents of active hydrogen-containing groups) is advantageously from about 0.9 to about 3.0, preferably about 1.0 to about 2.0 and most preferably from about 1.0 to about 1.5.

Any of the known organic compounds but preferably polyols containing at least two isocyanate-reactive hydrogen atoms and having a hydroxyl (OH) value of from about 200 to about 650, preferably from about 400 to about 500, may be employed in the process of the present invention.

Suitable high functionality, high molecular weight polyols may be prepared by reacting a suitable initiator containing active hydrogens with alkylene oxide. Suitable initiators are those containing at least 4 active hydrogens or combinations of initiators where the mole average of active hydrogens is at least 4, preferably from about 4 to about 8, and more preferably from about 6 to about 8. Active hydrogens are defined as those hydrogens which are observed in the well-known Zerewitinoff test, see Kohler, Journal of the American Chemical Society, p. 3181, Vol. 49 (1927). Representative of such active hydrogen-containing groups include —OH, —COOH, —SH and —NHR where R is H or alkyl, aryl aromatic group and the like.

Examples of suitable initiators include pentaerythritol, carbohydrate compounds such as lactose, $\alpha$-methylglucoside, $\alpha$-hydroxyethylglucoside, hexitol, heptitol, sorbitol, dextrose, manitol, sucrose and the like. Examples of suitable aromatic initiators containing at least four active hydrogens include aromatic amines such as toluene diamine and methane diphenylamine, the reaction product of a phenol with formaldehyde, and the reaction product of a phenol with formaldehyde and a dialkanolamine such as described by U.S. Pat. Nos. 3,297,597; 4,137,265 and 4,383,102 (incorporated herein by reference). Other suitable initiators which may be used in combination with the initiators containing at least four active hydrogens include water, glycerine, trimethylolpropane, hexane triol, aminoethylpiperazine and the like. These initiators may contain less than four active hydrogens and therefore can only be employed in quantities such that the total mole average of active hydrogens per molecule remains at least about 3.5 or more. Particularly preferred initiators for the preparation of the high functionality, high molecular weight polyols comprise sucrose, dextrose, sorbitol, $\alpha$-methylglucoside, $\alpha$-hydroxyethylglucoside which may be employed separately or in combination with other initiators such as glycerine or water.

The polyols may be prepared by methods well-known in the art such as taught by Wurtz, The Encyclopaedia of Chemical Technology, Vol. 7, p. 257–266, Interscience Publishers Inc. (1951) and U.S. Pat. No. 1,922,459. For example polyols can be prepared by reacting, in the presence of an oxyalkylation catalyst, the initiator with an alkylene oxide. A wide variety of oxyalkylation catalysts may be employed, if desired, to promote the reaction between the initiator and the alkylene oxide. Suitable catalysts include those described in U.S. Pat. Nos. 3,393,243 and 4,595,743, incorporated herein by reference. However, it is preferred to use as a catalyst a basic compound such as an alkali metal hydroxide, e.g., sodium or potassium hydroxide, or a tertiary amine such as trimethylamine.

The reaction is usually carried out at a temperature of about 60° C. to about 160° C., and is allowed to proceed using such a proportion of alkylene oxide to initiator so as to obtain a polyol having a hydroxyl number ranging from about 200 to about 650, preferably about 300 to about 550, most preferably from about 350 to about 500. The hydroxyl number range of from about 200 to about 650 corresponds to an equivalent weight range of about 86 to about 280.

Polyols of higher hydroxyl number than 650 may be used as optional ingredients in the process of the present invention. Amine-based polyols having OH values greater than 650, preferably greater than 700 are particularly useful as optional ingredients.

The alkylene oxides which may be used in the preparation of the polyol include any compound having a cyclic ether group, preferably an $\alpha,\beta$-oxirane, and are unsubstituted or alternatively substituted with inert groups which do not chemically react under the conditions encountered whilst preparing a polyol. Examples of suitable alkylene oxides include ethylene oxide, propylene oxide, 1,2- or 2,3-butylene oxide, the various isomers of hexane oxide, styrene oxide, epichlorohydrin, epoxychlorohexane, epoxychloropentane and the like. Most preferred, on the basis of performance, availability and cost are ethylene oxide, propylene oxide, butylene oxide and mixtures thereof, with ethylene oxide, propylene oxide, or mixtures thereof being most preferred. When polyols are prepared with combinations of alkylene oxides, the alkylene oxides may be reacted as a complete mixture providing a random distribution of oxyalkylene units within the oxide chain of the polyol or alternatively they may be reacted in a step-wise manner so as to provide a block distribution within the oxyalkylene chain of the polyol.

Such polyols include a sucrose-initiated polyol propoxylated to an average hydroxyl number of from about 400 to about 500, a sorbitol-initiated polyol propoxylated to an average hydroxyl number of about 250 to about 290, a sorbitol-glycerine initiated polyol having nominally an average of about 4.0 to about 4.4 active hydrogens and propoxylated to a hydroxyl number of about 250 to about 290.

The polyol is used in a quantity sufficient to allow the preparation of low friability, good dimensionally stable and strong foams having a thermal conductivity of less than about 0.120 Btu-in./hr.ft$^2$°F.

Suitable optional polyols include polyether polyols, polyester polyols, polyhydroxy-terminated acetal resins, hydroxy-terminated amines and polyamines. Examples of these and other suitable materials are described more fully in U.S. Pat. No. 4,394,491, particularly in columns 3 to 5 thereof. Most preferred for preparing rigid foams are those having from about 2 to about 8, preferably from about 3 to about 8 active hydrogens and having a hydroxyl number from about 50 to about 800, preferably from about 200 to about 650, and more preferably from about 300 to about 550. Examples of such polyols include those commercially available under the product names Terate (available from Cape Industries) and Multranol (available from Mobay Corporation).

Other components useful in producing the polyurethanes of the present invention include surfactants, pigments, colorants, fillers, antioxidants, flame retardants, stabilizers, etc.

When preparing polyisocyanate-based foams, it is generally advantageous to employ a minor amount of a surfactant to stabilize the foaming reaction mixture until it obtains rigidity. Such surfactants advantageously comprise a liquid or solid organosilicon compound. Other, less preferred surfactants include polyethylene glycol ethers of long chain alcohols, tertiary amine or alkanolamine salts of long chain alkyl acid sulfate esters, alkylsulfonic esters, alkylarylsulfonic acids. Such surfactants are employed in amounts sufficient to stabilize the foaming reaction mixture against collapse and the formation of large, and uneven cells. Typically, about 0.2 to about 5.0 parts of the surfactant per 100 parts per weight polyol composition are sufficient for this purpose.

One or more catalysts for the reaction of the polyol and water with the polyisocyanate are advantageously used. Any suitable urethane catalyst may be used including the known tertiary amine compounds and organometallic compounds.

Examples of suitable tertiary amine catalysts include triethylenediamine, N-methylmorpholine, pentamethyldiethylenetriamine, dimethylcyclohexylamine, tetramethylethylenediamine, 1-methyl-4-dimethylaminoethylpiperazine, 3-methoxy-N-dimethylpropylamine, N-ethylmorpholine, diethylethanolamine, N-cocomorpholine, N,N-dimethyl-N',N'-dimethylisopropylpropylenediamine, N,N-diethyl-3-diethylaminopropylamine and dimethylbenzylamine. Examples of suitable organometallic catalysts include organomercury, organolead, organoferric and organotin catalysts, with organotin catalysts being preferred. Suitable organotin catalysts include tin salts of carboxylic acids such as dibutyltin di-2-ethyl hexanoate and dibutyltin dilaurate. Metal salts such as stannous chloride can also function as catalysts for the urethane reaction. A catalyst for the trimerization of polyisocyanates, such as an alkali metal alkoxide or carboxylate, may also optionally be employed herein. Such catalysts are used in an amount which measurably increases the rate of reaction of the polyisocyanate. Typical amounts are about 0.01 to about 1 part of catalyst per 100 parts by weight of polyol.

The components described may be employed to produce rigid polyurethane and polyurethane-modified isocyanurate foam. The isocyanate-reactive compound having an OH value of from about 200 to about 650 and any other optional polyol are reacted with an organic polyisocyanate in the presence of blowing agent, catalyst, surfactant, additives, fillers, etc. The rigid foams of the present invention may be made in a one-step process by reacting all of the ingredients together at once, or foams can be made by the so-called "quasi-prepolymer method." In the one-shot process where foaming is carried out in machines, the active hydrogen-containing compounds, catalyst, surfactants, blowing agents and optional additives may be introduced separately to the mixing head where they are combined with the polyisocyanate to give the polyurethane-forming mixture. The mixture may be poured or injected into a suitable container or molded as required. For use of machines with a limited number of component lines into the mixing head, a premix of all the components except the polyisocyanate can be advantageously employed. This simplifies the metering and mixing of the reacting components at the time the polyurethane-forming mixture is prepared.

Alternatively, the foams may be prepared by the so-called "quasi-prepolymer" method. In this method a portion of the polyol component is reacted in the absence of catalysts with the polyisocyanate component in proportion so as to provide from about 10 percent to about 30 percent of free isocyanate groups in the reaction product based on the prepolymer. To prepare foam, the remaining portion of the polyol is added and the components are allowed to react together in the presence of catalysts and other appropriate additives such as blowing agent, surfactant, etc. Other additives may be added to either the prepolymer or remaining polyol or both prior to the mixing of the components, whereby at the end of the reaction a rigid polyurethane foam is provided.

The polyurethane foams of this invention have a thermal conductivity of less than about 0.130, preferably less than about 0.120 Btu-in./hr.ft$^2$°F., are useful in a wide range of applications. Accordingly, not only can rigid appliance foam be prepared but spray insulation rigid insulating board stock, laminates and many other types of rigid foam can easily be prepared with the process of this invention.

Having thus described my invention, the following Examples are given as being illustrative thereof. All parts and percentages given in these Examples are parts by weight and percentages by weight, unless otherwise indicated.

EXAMPLES

The materials used in the Examples given below were as follows:

POLYOL A: a sucrose-based polyether polyol which is commercially available under the name Multranol 4034 from Mobay Corporation having more than 4 isocyanate reactive hydrogen atoms and a hydroxyl number of 470.

POLYOL B: a high functionality polar aromatic polyester polyol derived from a dimethyl terephthalate coproduct which is commercially available under the name Terate 552 from Cape Industries having a hydroxyl number of approximately 420.

POLYOL C: an amine based polyol which is commercially available from Mobay Corporation having a functionality of four and an OH value of 770.

SURFACTANT A: a polyalkyleneoxide dimethyl siloxane copolymer, commercially available from Union Carbide under the designation L-5440.

CATALYST A: a strongly basic, amber-brown liquid having a characteristic amine odor which is commercially available from Air Products and Chemicals, Inc. under the name Polycat 41.

CATALYST B: N,N,N',N'-tetramethyl hexamethylene diamine

CATALYST C: a tertiary amine catalyst which is commercially available from Air Products and Chemicals, Inc. under the name Polycat 8.

Catalyst D: dibutyltin dilaurate.

HCFC-123: 1,1-dichloro-2,2,2-trifluoroethane.

HCFC-141b: dichlorofluoroethane.

POLYISOCYANATE A: a modified polymethylene polyphenyl polyisocyanate prepolymer which is commercially available under the name Mondur E-577 from Mobay Corporation having an isocyanate group content of approximately 29.5%.

POLYISOCYANATE B: Mondur MR isocyanate, a commercially available polymethylene polyphenyl polyisocyanate from Mobay Corporation, having an NCO content of about 31%.

With the exception of the polyisocyanate, all of the ingredients included in the formulations specified in Table 1 were combined in the amounts indicated. The isocyanate was then added to the mixture in the amount indicated in Table 1. The mixture which was maintained at a temperature of about 20° C. was then stirred with an air stirrer for approximately 5 seconds and poured into a cardboard box lined with plastic. The properties of the resultant foams are given in Table 1.

TABLE 1

| Example | 1 | 2 | 3 | 4 | 5 | 6 | 7 | 8 | 9 | 10 | 11 |
|---|---|---|---|---|---|---|---|---|---|---|---|
| Polyol A (pbw) | 27.95 | 29.76 | 30.20 | 31.20 | 32.42 | 33.40 | 67.00 | 69.70 | 70.48 | 72.26 | 73.50 |
| Polyol B (pbw) | 22.36 | 23.80 | 24.16 | 24.96 | 25.94 | 26.72 | — | — | — | — | — |
| Polyol C (pbw) | 5.59 | 5.95 | 6.04 | 6.24 | 6.49 | 6.68 | — | — | — | — | — |
| Stabilizer (pbw) | 1.70 | 1.80 | 1.90 | 1.95 | 2.10 | 2.20 | 1.50 | 1.60 | 1.70 | 1.80 | 1.90 |
| Catalyst A (pbw) | 0.85 | 0.80 | 0.75 | 0.70 | 0.65 | 0.60 | — | — | — | — | — |
| Catalyst B (pbw) | 1.55 | 1.45 | 1.35 | 1.25 | 1.15 | 1.05 | — | — | — | — | — |
| Water (pbw) | — | 0.34 | 0.60 | 1.20 | 1.80 | 2.40 | — | 0.32 | 0.64 | 1.00 | 1.30 |
| HCFC-123 (pbw) | 40.00 | 36.10 | 35.00 | 32.50 | 29.45 | 26.90 | — | — | — | — | — |
| HCFC-141b (pbw) | — | — | — | — | — | — | 29.12 | 26.00 | 24.80 | 22.56 | 20.92 |
| Polyisocyanate A (pbw) | 84.1 | 96.2 | 102.7 | 117.6 | 133.2 | 147.9 | — | — | — | — | — |
| Polyisocyanate B (pbw) | — | — | — | — | — | — | 77.3 | 85.3 | 91.1 | 98.7 | 104.7 |
| Catalyst C (pbw) | — | — | — | — | — | — | 2.10 | 2.10 | 2.10 | 2.10 | 2.10 |
| Catalyst D (pbw) | — | — | — | — | — | — | 0.28 | 0.28 | 0.28 | 0.28 | 0.28 |
| Cream Time (sec) | 13 | 12 | 13 | 13 | 13 | 13 | 20 | 22 | 23 | 24 | 22 |
| Gel Time (sec) | 34 | 31 | 34 | 33 | 34 | 35 | 42 | 44 | 48 | 48 | 46 |
| Tack Free (sec) | 50 | 52 | 52 | 51 | 53 | 55 | 48 | 55 | 60 | 60 | 56 |
| Friability (5 min) | none | none | none | none | slight | moderate | — | — | — | — | — |
| Density (lbs/ft$^3$) | 1.52 | 1.59 | 1.58 | 1.52 | 1.55 | 1.53 | 1.63 | 1.70 | 1.65 | 1.68 | 1.63 |
| K-factor | 0.118 | 0.117 | 0.118 | 0.122 | 0.125 | 0.128 | 0.125 | 0.128 | 0.131 | 0.139 | 0.139 |

$$\left( \frac{\text{Btu-in}}{\text{hr ft}^2 \cdot \text{F}} \right)$$

| Example | 12 | 13 | 14 | 15 | 16 | 17 | 18 | 19 | 20 | 21 |
|---|---|---|---|---|---|---|---|---|---|---|
| Polyol A (pbw) | 31.60 | 32.93 | 33.33 | 34.08 | 35.05 | 59.70 | 63.11 | 64.22 | 66.53 | 68.24 |
| Polyol B (pbw) | 25.28 | 26.34 | 26.66 | 27.28 | 28.04 | — | — | — | — | — |
| Polyol C (pbw) | 6.32 | 6.58 | 6.67 | 6.82 | 7.01 | — | — | — | — | — |
| Stabilizer (pbw) | 1.80 | 1.85 | 1.90 | 2.00 | 2.10 | 1.60 | 1.70 | 1.80 | 1.90 | 2.00 |
| Catalyst A (pbw) | 0.90 | 0.85 | 0.80 | 0.75 | 0.70 | — | — | — | — | — |
| Catalyst B (pbw) | 1.70 | 1.60 | 1.50 | 1.40 | 1.30 | — | — | — | — | — |
| Water (pbw) | — | 0.35 | 0.64 | 1.28 | 1.90 | — | 0.30 | 0.60 | 0.90 | 1.20 |
| HCFC-123 (pbw) | — | — | — | — | — | 36.70 | 33.00 | 31.50 | 28.69 | 26.47 |
| HCFC-141b (pbw) | 32.40 | 29.50 | 28.50 | 26.70 | 23.90 | — | — | — | — | — |
| Polyisocyanate A (pbw) | 95.0 | 105.9 | 112.9 | 127.8 | 143.0 | — | — | — | — | — |
| Polyisocyanate B (pbw) | — | — | — | — | — | 68.9 | 77.4 | 83.6 | 90.6 | 97.1 |
| Catalyst C (pbw) | — | — | — | — | — | 1.80 | 1.70 | 1.70 | 1.80 | 1.90 |
| Catalyst D (pbw) | — | — | — | — | — | 0.20 | 0.19 | 0.18 | 0.18 | 0.19 |
| Cream Time (sec) | 11 | 11 | 11 | 12 | 11 | 28 | 30 | 35 | 30 | 25 |
| Gel Time (sec) | 28 | 28 | 28 | 29 | 28 | 47 | 49 | 55 | 57 | 50 |
| Tack Free (sec) | 44 | 44 | 45 | 46 | 45 | 58 | 62 | 75 | 76 | 64 |
| Friability (5 min) | none | none | none | slight | moderate | none | none | none | none | none |
| Density (lbs/ft$^3$) | 1.55 | 1.54 | 1.55 | 1.52 | 1.49 | 1.76 | 1.73 | 1.65 | 1.63 | 1.69 |
| K-factor | 0.117 | 0.118 | 0.120 | 0.124 | 0.126 | 0.132 | 0.126 | 0.129 | 0.131 | 0.129 |

$$\left( \frac{\text{Btu-in}}{\text{hr ft}^2 \cdot \text{F}} \right)$$

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a rigid polyurethane foam having a thermal conductivity of less than about 0.130 Btu-in./hr.ft$^2$°F. comprising reacting
   a) an organic polyisocyanate with
   b) an organic material having at least two isocyanate-reactive hydrogen atoms and an OH value of from about 200 to about 650 in he presence of
   c) from about 0.1 to about 1.0% by weight of water and
   d) a blowing agent selected from the group consisting of 1,1-dichloro-2,2,2-trifluoroethane and dichlorofluorethane.

2. The process of claim 1 in which the polyisocyanate has an NCO content of from about 28 to about 34%.

3. The process of claim 1 in which the organic material having at least two isocyanate reactive hydrogen groups and an OH value of from about 200 to about 650 is a polyol.

4. The process of claim 1 in which the organic material having at least two isocyanate reactive groups is a mixture of
   (i) a polyether polyol and
   (ii) an aromatic ester polyol.

5. The process of claim 4 in which an amine polyol having at least two isocyanate reactive hydrogen atoms and an OH value of from about 200 to about 800 is included in the foam forming mixture.

6. The process of claim 5 in which the blowing agent d) is 1,1-dichloro-2,2,2-trifluoroethane.

7. The process of claim 4 in which the polyisocyanate is polymethylene polyphenyl polyisocyanate having an isocyanate group content of from about 28 to about 34%.

8. The process of claim 6 in which the polyisocyanate is an NCO-prepolymer of polymethylene polyphenyl polyisocyanate having an isocyanate group content of from about 29 to about 30%.

9. The process of claim 7 in which from about 0.15% to out 0.6% by weight water is present during the reaction.

10. The process of claim 8 in which from about 0.15% to at 0.6% by weight water is present during the reaction.

* * * * *